United States Patent
Canfield

(10) Patent No.: US 8,260,519 B2
(45) Date of Patent: Sep. 4, 2012

(54) RETRACTABLE WHEEL COVERS

(75) Inventor: Elijah Canfield, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 786 days.

(21) Appl. No.: 12/391,699

(22) Filed: Feb. 24, 2009

(65) Prior Publication Data

US 2010/0217490 A1   Aug. 26, 2010

(51) Int. Cl.
  *G05D 1/00*   (2006.01)
  *B60T 7/12*   (2006.01)
  *G06F 7/00*   (2006.01)
  *G06F 17/00*  (2006.01)

(52) U.S. Cl. .......................................... 701/74

(58) Field of Classification Search .................... 701/49, 701/74; 296/181.5
See application file for complete search history.

(56) References Cited

U.S. PATENT DOCUMENTS

| | | | |
|---|---|---|---|
| 6,007,102 A * | 12/1999 | Helmus | 280/849 |
| 6,170,904 B1 | 1/2001 | Schaedlich et al. | |
| 6,517,026 B1 * | 2/2003 | Smith | 244/2 |
| 6,886,882 B2 * | 5/2005 | Farlow et al. | 296/180.4 |
| 6,886,883 B2 * | 5/2005 | Jacquemard et al. | 296/180.5 |
| 7,040,690 B2 * | 5/2006 | Soja et al. | 296/180.5 |
| 7,192,077 B1 | 3/2007 | Hilleman | |
| 7,380,869 B2 * | 6/2008 | Nakaya | 296/180.1 |
| 2007/0103280 A1 * | 5/2007 | Kanafani | 340/431 |
| 2008/0302014 A1 * | 12/2008 | Szczerba et al. | 49/31 |

* cited by examiner

*Primary Examiner* — Khoi Tran
*Assistant Examiner* — Harry Oh
(74) *Attorney, Agent, or Firm* — Young Basile Hanlon & Macfarlane, P.C.

(57) ABSTRACT

Disclosed herein are embodiments of wheel covers and vehicles having at least one wheel cover. One embodiment of a vehicle having at least one wheel mounted for rotation about an axle comprises a body structure having a portion of which is adjacent to the wheel, a mounting structure fixed to the portion of the body structure that is adjacent to the wheel and a wheel cover attached to the body structure via the mounting structure. The mounting structure is configured to permit movement of the wheel cover between an extended position in which the wheel cover overlays at least a first portion of the wheel and a retracted position in which the wheel cover does not overlay the first portion of the wheel. Also disclosed are methods of selectively covering a vehicle wheel.

22 Claims, 4 Drawing Sheets

RETRACTABLE WHEEL COVERS

FIELD OF THE INVENTION

The present invention relates in general to retractable wheel covers for vehicles having a wheel mounted for rotation about an axle. More particularly, the present invention relates to a wheel cover responsive to a vehicle's condition and methods of selectively covering a vehicle wheel.

BACKGROUND

A vehicle's fuel economy can be improved by making it smaller and lighter and giving it a smaller engine. But many consumers want sports cars, SUVs and trucks—while desiring good gas mileage, too. In an effort to improve fuel economy without shrinking vehicles, automakers have been increasingly turning to aerodynamics. The more aerodynamic a vehicle, the better fuel economy it will realize.

One way to improve the aerodynamics of a vehicle is to partially cover the wheels, in essence by extending the vehicle body over the wheel well. However, wheel covers obstruct the view of the wheel and the wheel rims, having a negative impact on aesthetics. Because of this, many vehicle owners, and thus automakers, are not taking advantage of the aerodynamic improvement provided by wheel covers.

BRIEF SUMMARY

Disclosed herein are embodiments of wheel covers and vehicles having at least one wheel cover. One embodiment of a vehicle having a wheel mounted for rotation about an axle comprises a body structure having a portion of which is adjacent to the wheel, a mounting structure fixed to the portion of the body structure that is adjacent to the wheel and a wheel cover attached to the body structure via the mounting structure. The mounting structure is configured to permit movement of the wheel cover between an extended position in which the wheel cover overlays at least a first portion of the wheel and a retracted position in which the wheel cover does not overlay the first portion of the wheel.

An embodiment of a wheel cover apparatus for a vehicle having at least one wheel mounted for rotation about an axle comprises a wheel cover, a mounting structure configured to movably attach the wheel cover to the vehicle adjacent the wheel while permitting movement of the wheel cover between an extended position in which the wheel cover overlays at least a first portion of the wheel and a retracted position in which the wheel cover does not overlay the first portion of the wheel and an actuator coupled to at least one of the mounting structure and the wheel cover configured to move the wheel cover between the extended position and the retracted position.

Also disclosed herein are methods of selectively covering at least a portion of a vehicle wheel with a wheel cover, wherein the wheel cover is movably mounted adjacent the wheel. One method disclosed herein comprises generating a signal from a condition sensor, providing the signal to a controller programmed with a predetermined threshold value and instructing an actuator with the controller to move the wheel cover to a retracted position if the signal goes below a threshold value and an extended position if the signal becomes equal to or above the threshold value.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
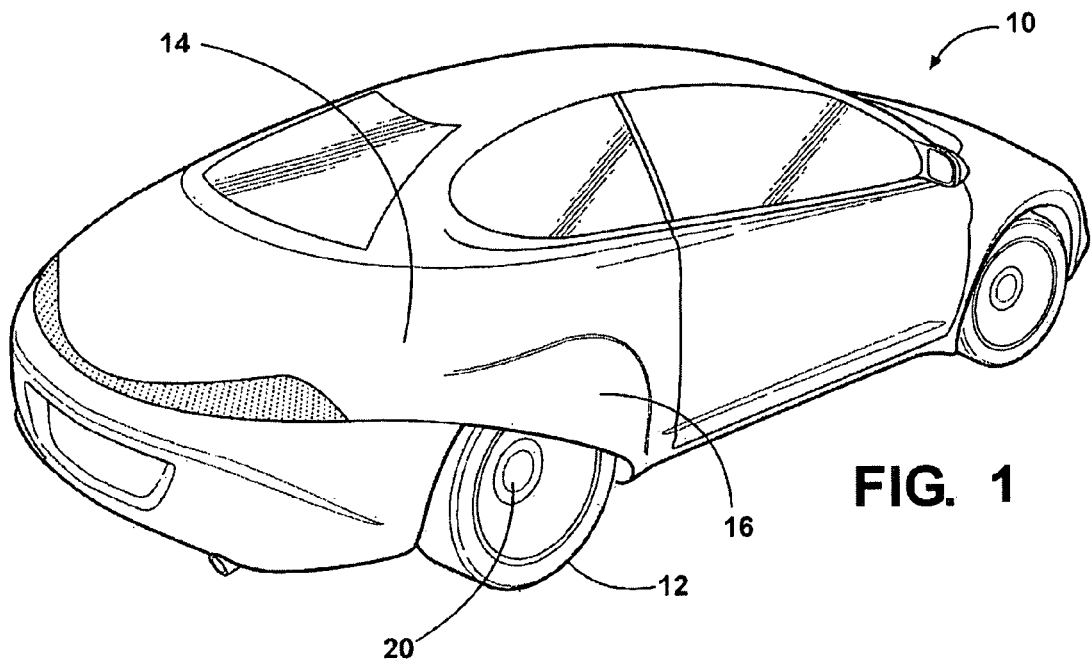
FIG. 1 is a rear perspective view of a vehicle having a retractable wheel cover in accordance with a first embodiment disclosed herein.
Figure 2:
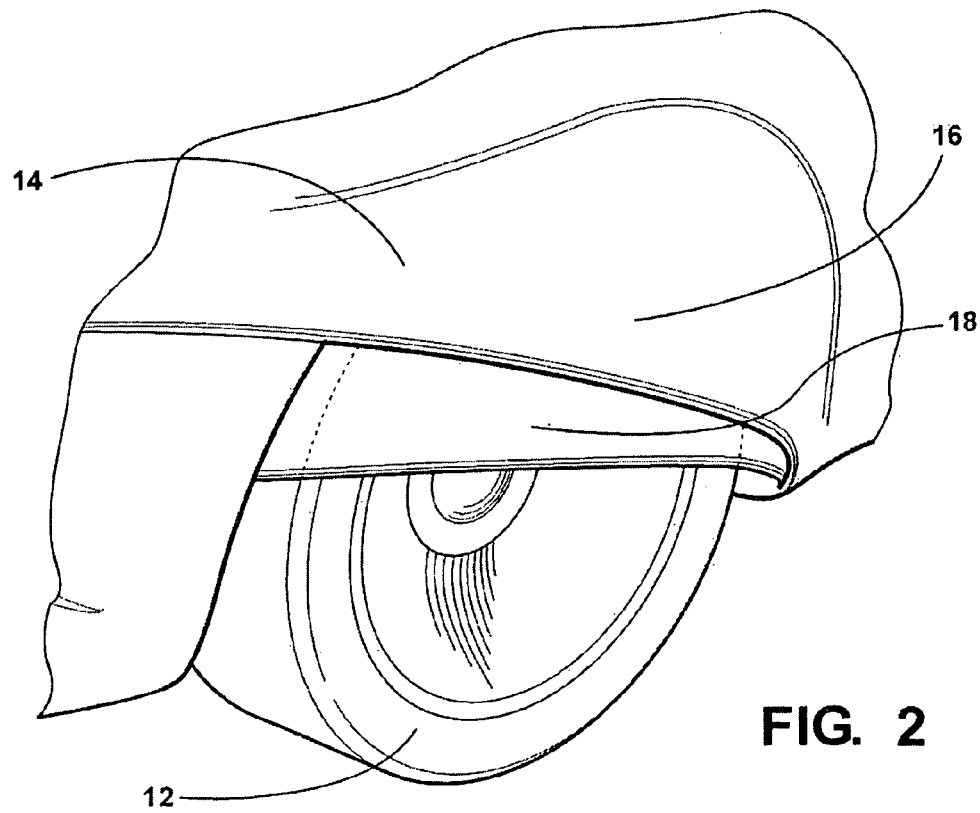
FIG. 2 is a detailed perspective view of the wheel cover of the vehicle in FIG. 1, showing the wheel cover in a first position.

FIG. 1 is a rear perspective view of a vehicle having a retractable wheel cover in accordance with a first embodiment disclosed herein. A vehicle 10 is shown having a wheel 12 mounted for rotation about an axle. The vehicle 10 has a body structure 14 having a portion 16 of which is adjacent to the wheel 12. A mounting structure (not shown) can be fixed to the portion 16 of the body structure 14 that is adjacent to the wheel 12. A wheel cover 18 (seen in FIG. 2) is attached to the body structure 14 via the mounting structure. The mounting structure is configured to permit movement of the wheel cover 18 between an extended position and a retracted position. In the extended position, the wheel cover 18 overlays at least a first portion 20 of the wheel 12, as shown in FIG. 2. In the retracted position, the wheel cover 18 does not overlay the first portion 20 of the wheel 12.

The vehicle 10 shown is provided by way of example and not limitation. Any vehicle having one or more wheels mounted for rotation about an axle is contemplated, including sedans, SUVs, pick-up trucks, RVs and the like. The body structure 14 can be any body structure and depends on the vehicle. The portion 16 of the body structure 14 adjacent to the wheel 12 can be any part of the body structure 14 capable of supporting the mounting structure and wheel cover 18 and capable of positioning the wheel cover 18 over at least a portion of the wheel 12. Although only one wheel is shown in the Figures, it is contemplated that more than one and all of the wheels may have wheel covers as disclosed herein. The vehicle 10 can be manufactured with the retractable wheel cover, or a wheel cover apparatus can be retrofitted onto the vehicle by an owner, mechanic, or manufacturer.

In FIG. 1, the wheel cover 18 is shown in its retracted position. As used herein, "retracted position" means a position exposing more wheel than an extended position. The retracted position of the wheel cover 18 allows the wheel 12 to be viewed as it would if no wheel cover 18 were used. In some cases, the entire wheel may be visible. Depending on the style of the vehicle 10, only a portion of the wheel 12 may be visible when the wheel cover 18 is in the retracted position, as shown in FIG. 1. The retracted position provides a vehicle owner with the aesthetics of a vehicle with no wheel covers 18.

In FIG. 2, the wheel cover 18 is shown in an extended position. As used herein, "extended position" means a position covering more of the wheel 12 than in a retracted position. In the extended position, at least a portion of the wheel 12 is covered by the wheel cover 18, improving the aerodynamics of the vehicle 10, and therefore, its fuel economy. The first portion 20 of the wheel 12 shown in FIG. 2 covered in the extended position by the wheel cover 18 is provided by way of example and is not meant to be limiting.

It is contemplated that the wheel cover 18 can cover any amount of the wheel 12 as desired or required. For example, in FIG. 3, the wheel cover 18 is shown in a second extended position covering a greater portion of the wheel 12. Multiple extended positions having different wheel coverage are contemplated.

The mounting structure, not shown in FIGS. 1 and 2, mounts the wheel cover 18 to the portion 16 of the body structure 14 that is adjacent to the wheel 12, as described above. The mounting structure in this embodiment is on the inside of the body structure 14 and therefore not visible. The wheel cover 18 is, therefore, also on the inside of the vehicle body structure 14 when in the retracted position. The embodiments herein are not limited to this configuration. It is contemplated that the mounting structure can be positioned on the outside of the body structure 14, with the wheel cover 18 also mounted outside of the body structure 14 via the mounting structure.

Figure 4:
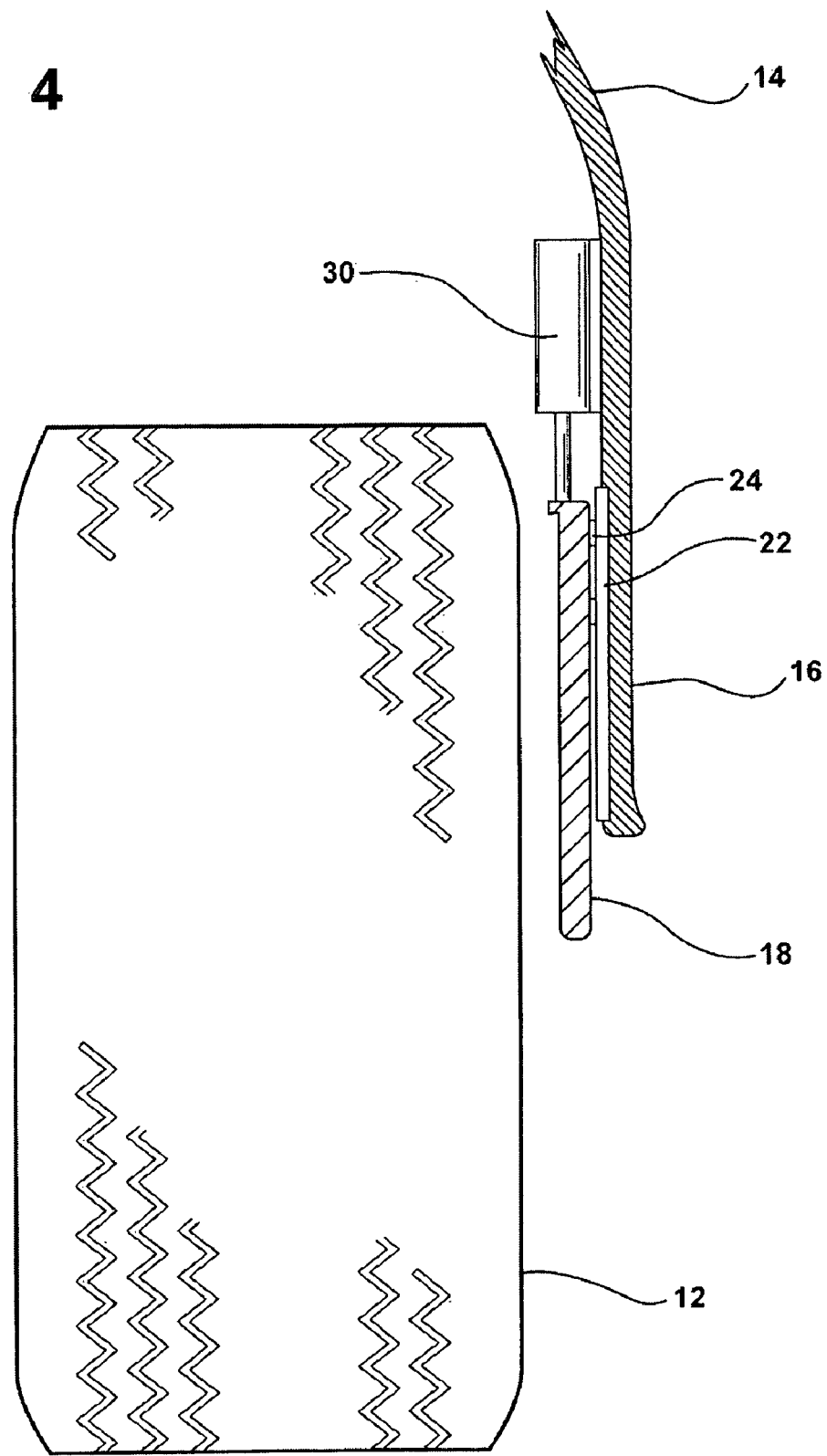
FIG. 4 is a sectional view of the vehicle of FIG. 1 showing a mounting structure in accordance with an embodiment disclosed herein.

An example of a mounting structure is shown in FIG. 4. In this example, the mounting structure is a track 22 used to mount the wheel cover 18 to the body structure 14 of the vehicle 10. The track 22 is positioned on the inside of the body structure 14 on a portion 16 adjacent the wheel 12 such that the track 22 directs the wheel cover 18 into the extended position over the wheel 12. The wheel cover 18 has at least one cooperating guide 24 that slides in the track 22. This mounting structure is provided by way of example and is not meant to be limiting. For example, the mounting structure can be a lever connected between the body structure 14 and the wheel cover 18 that pivots or rotates the wheel cover 18 between the retracted and the extended positions. The mounting structure may be more than one track or pivot. The mounting structure may be pistons that raise and lower the wheel cover 18. The wheel cover 18 can be configured as an accordion and the mounting structure can extend and retract the accordion. Any mounting structure can be used by those skilled in the art to accomplish moving the wheel cover 18 between the extended and retracted positions.

Figure 3:
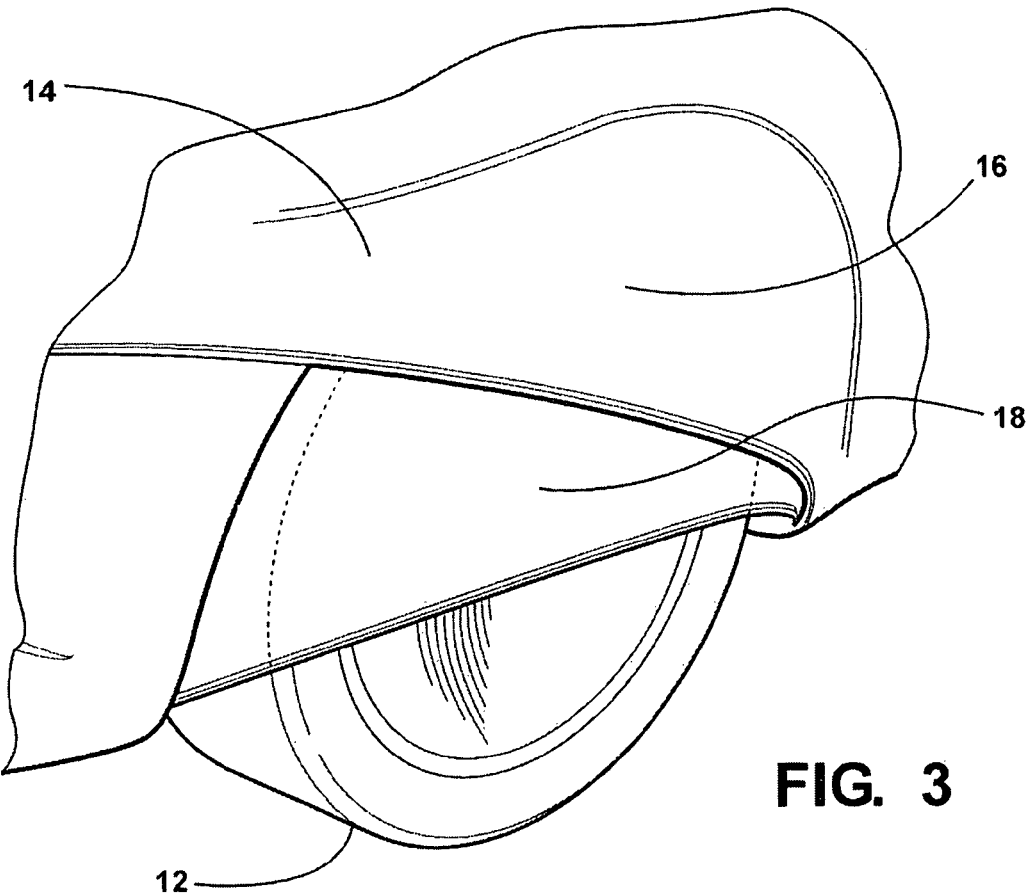
FIG. 3 is a detailed perspective view of the wheel cover of the vehicle in FIG. 1, showing the wheel cover in a second position.

The wheel cover 18 can be made of the same material as the body structure 14. The material of the wheel cover 18 is not limited and can be metal, plastic, resin, and the like. The wheel cover 18 can be clear so that the wheel 12 can be seen through the cover. The wheel cover 18 can be painted to match the vehicle body structure 14. The wheel cover 18 can have an exterior contour configured to provide an aerodynamic surface when the wheel cover is in the extended position. The exterior contour may follow the contour of the surrounding body structure as shown in FIGS. 2 and 3. The wheel cover 18 can include indicia such as a logo is desired or required.

Figure 5:
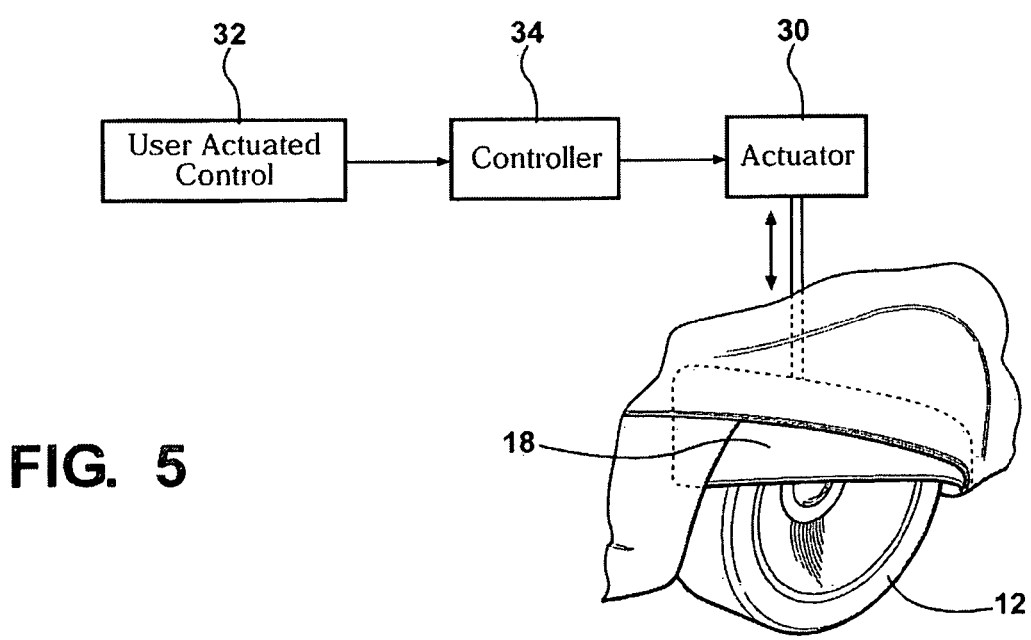
FIG. 5 is a block diagram showing a control system for controlling the retractable wheel cover of FIG. 1.

The embodiment of the vehicle with the retractable wheel cover described above can further comprise an actuator coupled to at least one of the mounting structure and the wheel cover to move the wheel cover between the extended position(s) and the retracted position. As shown in FIG. 5, the actuator 30 can be responsive to a user-actuated control 32 configured to generate a user control signal received by a controller 34 and sent to the actuator 30. The actuator 30 is responsive to the user control signal to move the wheel cover 18 into at least one of the extended position and the retracted position when the control signal is generated.

The user actuated control 32 can be mounted within the vehicle, and particularly within reach of the driver of the vehicle. For example, the user actuated control 32 can be mounted on a driver side door near the window and door lock actuator controls. Another example would be to position the user actuated control 32 on a center consol of the vehicle. The user actuated control 32 can be, for example, a lever, a push button, or a dial. The user actuated control 32 can be incorporated into the computer of a vehicle and be accessible through a control panel. These user actuated controls 32 are provided by way of example and not limitation. One skilled in the art can use any control as desired or required to achieve communication with the actuator 30.

Figure 6:
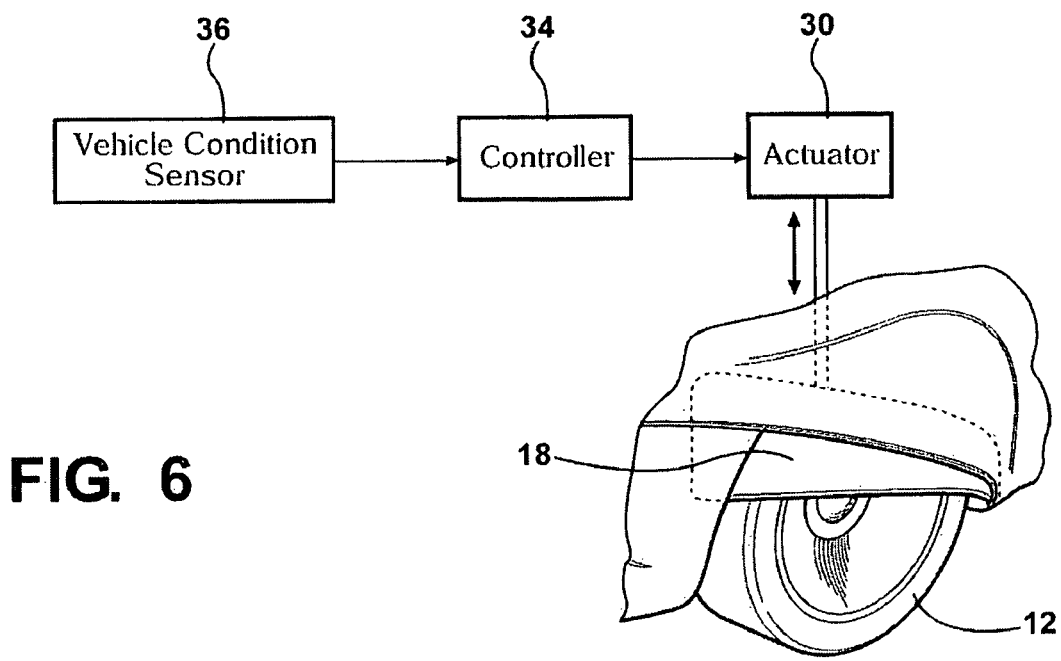
FIG. 6 is a block diagram showing another control system for controlling the retractable wheel cover of FIG. 1.

Alternative to or in addition to the user actuated control 32 described above, the actuator 30 can be responsive to a vehicle condition sensor 36 configured to generate a condition signal indicative of a vehicle condition, as shown in FIG. 6. The controller 34 receives the vehicle condition signal and instructs the actuator 30 to move the wheel cover 18 into one of the extended position and retracted position.

The vehicle condition to which the actuator 30 responds can be whether or not the vehicle transmission is in a driving mode or in park. If the vehicle transmission is in park, the vehicle condition sensor 36 generates a condition signal indicating the vehicle is in park. The actuator 30 responds to the signal by moving the wheel cover 18 into the retracted position so that the wheel 12 is exposed. If the vehicle transmission is in a drive mode, the vehicle condition sensor 36 generates a condition signal indicating the vehicle is in a drive mode. The actuator 30 responses to the condition signal by moving the wheel cover 18 into the extended position covering at least a portion of the wheel 12 to improve the vehicle's aerodynamics while driving.

The controller 34 may be programmed to instruct the actuator 30 to move the wheel cover 18 only after a predetermined amount of time. For example, only when the vehicle transmission has been in a drive mode for three minutes is the actuator 30 instructed to move the wheel cover 18 into the extended position.

The vehicle condition can be whether the vehicle's speed is greater than zero. If the vehicle speed is not greater than zero, the vehicle condition sensor 36 generates a condition signal indicating the vehicle is not moving. The actuator 30 responds to the signal by moving the wheel cover 18 into the retracted position so that the wheel 12 is exposed. If the vehicle speed is greater than zero, the vehicle condition sensor 36 generates a condition signal indicating the vehicle is moving. The actuator 30 responses to the condition signal by moving the wheel cover 18 into the extended position covering at least a portion of the wheel 12 to improve the vehicle's aerodynamics while driving. Again, a predetermined amount of time can be incorporated.

Figure 7:
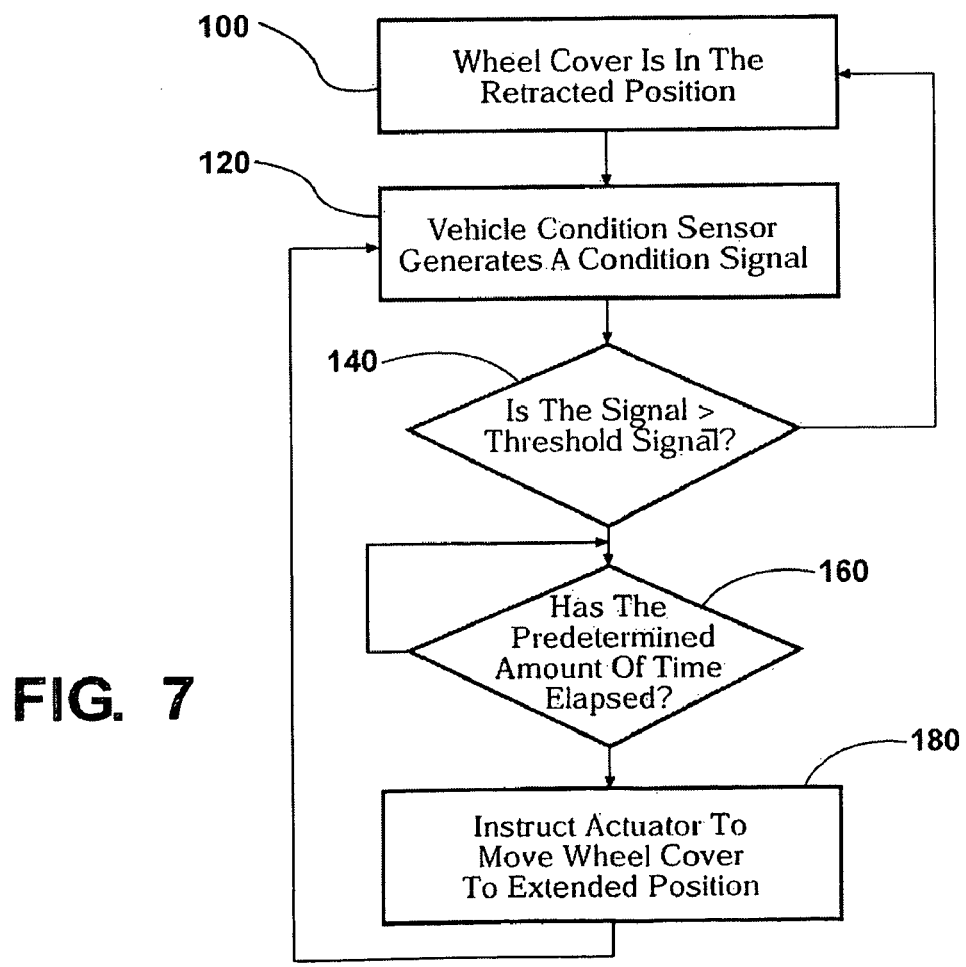
FIG. 7 is a logic diagram showing operation of the control system of FIG. 6.

FIG. 7 is a logic flow diagram showing the operation of a vehicle condition sensor control system. In this example, the vehicle condition is whether the vehicle's speed is greater than a threshold speed. The vehicle begins in a position in which its speed is zero. Therefore, in step 100, the wheel cover is in the retracted position. In step 120, the vehicle condition sensor generates a condition signal based on the speed of the vehicle. In step 140, the controller determines whether or not the vehicle speed is equal to or greater than the threshold speed. If the vehicle speed is less than the threshold speed, the controller does not instruct the actuator and the wheel cover remains in the retracted position of step 100. If the vehicle speed is equal to or greater than the threshold speed, the process proceeds to step 160. In step 160, the controller determines whether the predetermined amount of time has elapsed. If it has not, no instructions are sent to the actuator and the time is monitored. If the predetermined amount of time has passed, the process proceeds to step 180, where the actuator is instructed to move the wheel cover to the extended position. The process continues while the vehicle is in operation.

The vehicle conditions described above are provided by way of example and are not meant to be limiting. Other vehicle conditions can be detected and responded to as desired or required. The vehicle can be equipped with one or more vehicle condition sensor 36. The vehicle can be equipped with both the user actuated control 32 and one or more vehicle condition sensor 36.

As discussed above, the extended position can be a plurality of partially extended positions in which the wheel cover covers varying portions or degrees of the wheel. The partially extended positions can be chosen by the user through the user actuated control 32. The partially extended positions can be programmed in the controller 34 and based on the gear the transmission is in. As the gear increases, more wheel is covered. The partially extended positions can be programmed in the controller 34 and based on the speed the vehicle is traveling. As the speed increases, the amount of wheel covered will increase. The change in the extended positions can be stepped or can be continuous.

Embodiments of wheel cover apparatus are also disclosed herein such that a vehicle can be retrofitted with the wheel cover systems described above. An embodiment of a wheel cover apparatus for a vehicle having at least one wheel mounted for rotation about an axle can comprise a wheel cover, a mounting structure, and an actuator. The mounting structure is configured to movably attach the wheel cover to the vehicle adjacent the wheel while permitting movement of the wheel cover between an extended position in which the wheel cover overlays at least a first portion of the wheel and a retracted position in which the wheel cover does not overlay the first portion of the wheel. The actuator can be coupled to at least one of the mounting structure and the wheel cover configured to move the wheel cover between the extended position and the retracted position. The cover, mounting structure and actuator system are described in detail above.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle having a wheel having a treaded surface and an outer face, the wheel mounted for rotation about an axle, comprising:
    a body structure, a portion of which is adjacent to the wheel and outboard of the outer face of the wheel in a cross-vehicle direction;
    a mounting structure fixed to the portion of the body structure that is adjacent to the wheel; and
    a wheel cover attached to the body structure via the mounting structure, wherein the mounting structure is configured to permit movement of the wheel cover in a vertical plane between an extended position in which the wheel cover overlays at least a first portion of the outer face of the wheel and a retracted position in which the wheel cover does not overlay the first portion of the outer face of the wheel, wherein the wheel cover is configured to successively overlay greater portions of the outer face of the wheel as the wheel cover moves from the retracted position to the extended position.

2. The vehicle of claim 1, further comprising an actuator coupled to at least one of the mounting structure and the wheel cover to move the wheel cover between the extended position and the retracted position.

3. The vehicle of claim 2, further comprising a user-actuated control configured to generate a user control signal, wherein the actuator is responsive to the control signal to move the wheel cover into at least one of the extended position and the retracted position when the user control signal is generated.

4. The vehicle of claim 2, further comprising a vehicle condition sensor configured to generate a condition signal indicative of a vehicle condition, wherein the actuator is responsive to the condition signal to move the wheel cover into at least one of the extended position and the retracted position.

5. The vehicle of claim 4, wherein the vehicle condition is one of: a vehicle transmission being in a driving mode; the vehicle's speed being greater than zero; and the vehicle's speed being greater than a threshold value.

6. The vehicle of claim 5, wherein the actuator is responsive to the vehicle condition sensor to move the wheel cover to the extended position when the condition signal indicates that the vehicle condition exists and to move the cover to the retracted position when the condition signal indicates that the vehicle condition does not exist.

7. The vehicle of claim 1, wherein the mounting structure includes at least one pivot about which the wheel cover may rotate into and out of its extended and retracted positions.

8. The vehicle of claim 1, wherein the mounting structure includes at least one track along which the wheel cover slides into and out of its extended and retracted positions.

9. The vehicle of claim 2, wherein the extended position comprises a plurality of partially extended positions in which the wheel cover covers varying portions of the wheel, and wherein the actuator is configured to move the wheel cover to a selected one of the partially extended positions based upon a speed of the vehicle.

10. A wheel cover apparatus for a vehicle having at least one wheel mounted for rotation about an axle comprising:
    a wheel cover;
    a mounting structure configured to movably attach the wheel cover to a portion of the vehicle adjacent the wheel and positioned outboard of an outer face of the wheel in a cross-vehicle direction while permitting movement of the wheel cover along a vertical plane between an extended position in which the wheel cover overlays at least a first portion of an outer face of the wheel and a retracted position in which the wheel cover does not overlay the first portion of the wheel, wherein the wheel cover is configured to successively overlay greater portions of the outer face of the wheel as the wheel cover moves from the retracted position to the extended position; and
    an actuator coupled to at least one of the mounting structure and the wheel cover configured to move the wheel cover between the extended position and the retracted position.

11. The wheel cover apparatus of claim 10, further comprising a user-actuated control configured to generate a user control signal, wherein the actuator is responsive to the control signal to move the wheel cover into at least one of the extended position and the retracted position when the user control signal is generated.

12. The wheel cover apparatus of claim 10, further comprising a vehicle condition sensor configured to signal a vehicle condition, wherein the actuator is responsive to the condition signal to move the wheel cover into at least one of the extended position and the retracted position.

13. The wheel cover apparatus of claim 12, wherein the vehicle condition is one of the vehicle's speed being greater than zero and the vehicle's speed being greater than a threshold value, and wherein the actuator is responsive to the vehicle condition signal to move the wheel cover to the extended position when the condition signal indicates that the vehicle condition exists and to move the cover to the retracted position when the condition signal indicates that the vehicle condition does not exist.

14. The wheel cover apparatus of claim 10, wherein the mounting structure includes one or more of at least one pivot about which the wheel cover may rotate into and out of its extended and retracted positions and at least one track along which the wheel cover slides into and out of its extended and retracted positions.

15. The wheel cover apparatus of claim 10, wherein the extended position comprises a plurality of partially extended positions in which the wheel cover covers varying portions of the wheel, and wherein the actuator is configured to move the cover to a selected one of the partially extended positions based upon a speed of the vehicle.

16. A method of selectively covering at least a portion of a vehicle wheel with a wheel cover, wherein the wheel cover is movably mounted adjacent the wheel, the wheel having a treaded surface and an outboard face, the method comprising:
generating a signal from a condition sensor;
providing the signal to a controller programmed with a predetermined threshold value; and
instructing an actuator with the controller to move the wheel cover along a vertical plane to a retracted position in which the wheel cover does not overlay the outboard face of the vehicle wheel in a cross-vehicle direction if the signal goes below a threshold value and along the vertical plane to an extended position in which the wheel cover overlays the outboard face of the vehicle wheel in the cross-vehicle direction if the signal becomes equal to or above the threshold value.

17. The method of claim 16, wherein the condition sensor is one or more of a vehicle condition sensor and a user generated condition sensor.

18. The method of claim 16 wherein the controller is further programmed with a predetermined amount of time, and wherein the method further comprises:
instructing the actuator only after the predetermined amount of time has elapsed.

19. The vehicle of claim 1, wherein the wheel cover is a planar member that is substantially situated along a plane that is parallel to a longitudinal direction of the vehicle.

20. The wheel cover apparatus of claim 10, wherein the wheel cover is a planar member that is substantially situated along a plane that is parallel to a longitudinal direction of the vehicle.

21. The vehicle of claim 1, wherein the portion of the body structure adjacent to the wheel and the wheel define a gap there between, with the wheel cover moving within the gap between the extended position and retracted position.

22. The wheel cover apparatus of claim 10, wherein the wheel and the portion of the vehicle situated outboard of the outer face of the wheel define a gap there between, with the wheel cover moving within the gap between the extended position and retracted position.

\* \* \* \* \*